(12) United States Patent
Yocius et al.

(10) Patent No.: US 11,543,810 B2
(45) Date of Patent: Jan. 3, 2023

(54) SYSTEMS AND METHODS FOR COMPUTER VISION ASSISTED FOAM BOARD PROCESSING

(71) Applicant: Stepan Company, Northfield, IL (US)

(72) Inventors: Daniel Yocius, Western Springs, IL (US); David J. Norberg, Grayslake, IL (US); Sean O'Cuanaigh, Orlando, FL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 17/542,087

(22) Filed: Dec. 3, 2021

(65) Prior Publication Data
US 2022/0091599 A1 Mar. 24, 2022

Related U.S. Application Data

(63) Continuation of application No. PCT/US2021/047861, filed on Aug. 27, 2021.
(Continued)

(51) Int. Cl.
*G05B 19/418* (2006.01)
*C08G 18/08* (2006.01)
(Continued)

(52) U.S. Cl.
CPC ... *G05B 19/41875* (2013.01); *C08G 18/0804* (2013.01); *G05B 1/11* (2013.01); *G05B 13/024* (2013.01); *G05B 19/4183* (2013.01)

(58) Field of Classification Search
CPC .. G05B 19/41875; G05B 1/11; G05B 13/024; G05B 19/4183; C08G 18/0804; G06T 7/0004; G06T 2207/30108
See application file for complete search history.

(56) References Cited

U.S. PATENT DOCUMENTS 3,946,212 A * 3/1976 Nakao .............. G05B 19/41875
   700/89
4,422,988 A   12/1983 Kornylak
   (Continued)

FOREIGN PATENT DOCUMENTS

EP   2631055   8/2013
EP   3267147   1/2018
   (Continued)

OTHER PUBLICATIONS

WALLTITE® The airtight insulation solution, Technology Guide, Spray Foam Insulation, Oct. 2014, 27 pgs.
(Continued)

*Primary Examiner* — Schyler S Sanks
(74) *Attorney, Agent, or Firm* — McAndrews Held & Malloy, Ltd.

(57) ABSTRACT

Methods and systems for manufacturing a foam board system are disclosed. In some examples, a system includes an applicator to distribute one or more fluids onto a substrate. One or more sensors configured to measure one or more characteristics of the one or more fluids. A control circuitry is configured to compare the one or more measured characteristics to one or more threshold characteristics, and to adjust one or more operating parameters of the system in response to a characteristic of the one or more measured characteristics falling outside a threshold of the one or more threshold characteristics.

28 Claims, 5 Drawing Sheets

Related U.S. Application Data

(60) Provisional application No. 63/071,999, filed on Aug. 28, 2020.

(51) Int. Cl.
   *G05B 1/11*   (2006.01)
   *G05B 13/02*  (2006.01)

(56) References Cited

U.S. PATENT DOCUMENTS

| | | | | |
|---|---|---|---|---|
| 4,481,589 | A | * | 11/1984 | McGowan ............... G07C 3/14 700/74 |
| 6,140,383 | A | * | 10/2000 | Soukup ................ B29C 44/304 521/137 |
| 7,838,568 | B2 | | 11/2010 | Letts et al. |
| 8,153,039 | B2 | | 4/2012 | Tackett et al. |
| 9,815,256 | B2 | | 11/2017 | Nandi et al. |
| 2004/0065973 | A1 | * | 4/2004 | Ehbing ................ B29C 44/60 425/4 C |
| 2008/0179446 | A1 | | 7/2008 | Cocciadiferro et al. |
| 2015/0218302 | A1 | | 8/2015 | Brady, III et al. |
| 2017/0095952 | A1 | | 4/2017 | Arnauts |
| 2018/0053124 | A1 | * | 2/2018 | Kimura ................... G06Q 10/06 |
| 2020/0026266 | A1 | * | 1/2020 | Taniguchi ........ G05B 19/41875 |
| 2020/0217652 | A1 | | 7/2020 | Johnson, Jr. et al. |
| 2020/0301403 | A1 | * | 9/2020 | Izumi ..................... B23K 26/38 |

FOREIGN PATENT DOCUMENTS

| | | |
|---|---|---|
| GB | 2325640 A | 12/1998 |
| JP | H06147875 | 5/1994 |
| WO | 2014188221 | 11/2014 |
| WO | 2017009642 | 1/2017 |
| WO | WO-2019040262 A1 * | 2/2019 ............ B29C 44/60 |
| WO | 2021071811 | 4/2021 |

OTHER PUBLICATIONS

Int'l Search Report and Written Opinion Appln No. PCT/US2021/047861 dated Dec. 21, 2021.

* cited by examiner

SYSTEMS AND METHODS FOR COMPUTER VISION ASSISTED FOAM BOARD PROCESSING

CROSS REFERENCE TO RELATED APPLICATIONS

This application is a Non-Provisional Patent Application of U.S. Provisional Patent Application No. 63/071,999 entitled "Systems and Methods for Computer Vision Assisted Foam Board Processing" filed Aug. 28, 2021, which is herein incorporated by reference in its entirety.

BACKGROUND OF THE INVENTION

The present technology relates to methods and systems to monitor and/or determine one or more characteristics of a manufactured board.

Polyurethane and polyisocyanurate foams are commonly used in the production of manufactured foam boards over other boards in the construction industry due to superior mechanical properties, fire performance, and insulation value. These high performance characteristics are attributed to the fine cell structure within the board, which is created during the manufacturing process.

Some manufacturing techniques, such as those intended to reduce costs of manufacturing foam insulation paneling, have resulted in issues during the manufacturing process and/or in the finished product, such as degraded appearance and/or integrity. Conventional methods to identify defects in a foam board are manual, labor-intensive, and many of the indicators of optimum processing conditions are subjectively determined, which may be prone to operator error. Such methods are also limited to a small number of measurement locations on the board. The result is a slow, resource intensive process that often fails to provide a complete assessment of the board's appearance and/or integrity.

Based on the deficiencies of the current techniques, a more efficient, more complete method and apparatus to monitor, determine, and/or control characteristics of a manufactured board is desirable.

SUMMARY OF THE INVENTION

In one aspect, this disclosure provides systems for manufacturing a foam board. In some examples, a system includes an applicator to distribute one or more fluids onto a substrate. One or more sensors are configured to measure one or more characteristics of the one or more fluids. A control circuitry is configured to compare the one or more measured characteristics to one or more threshold characteristics, and to adjust one or more operating parameters of the applicator in response to a characteristic of the one or more measured characteristics falling outside a threshold of the one or more threshold characteristics.

In a further aspect, this disclosure provides a method of manufacturing a foam board. The method includes measuring, by a sensor, one or more characteristics corresponding to distribution of one or more fluids applied to a substrate, receiving, at a control circuitry, data corresponding to the one or more characteristics, comparing, at the control circuitry, the one or more measured characteristics to one or more threshold characteristics, identifying, at the control circuitry, one or more operating parameters corresponding to the one or more measured characteristics, and adjusting one or more operating parameters in response to a characteristic of the one or more measured characteristics falling outside a threshold of the one or more threshold characteristics.

BRIEF DESCRIPTION OF THE DRAWINGS

The figures are not necessarily to scale. Where appropriate, similar or identical reference numbers are used to refer to similar or identical components.

DETAILED DESCRIPTION OF THE PREFERRED EMBODIMENTS

Figure 1:
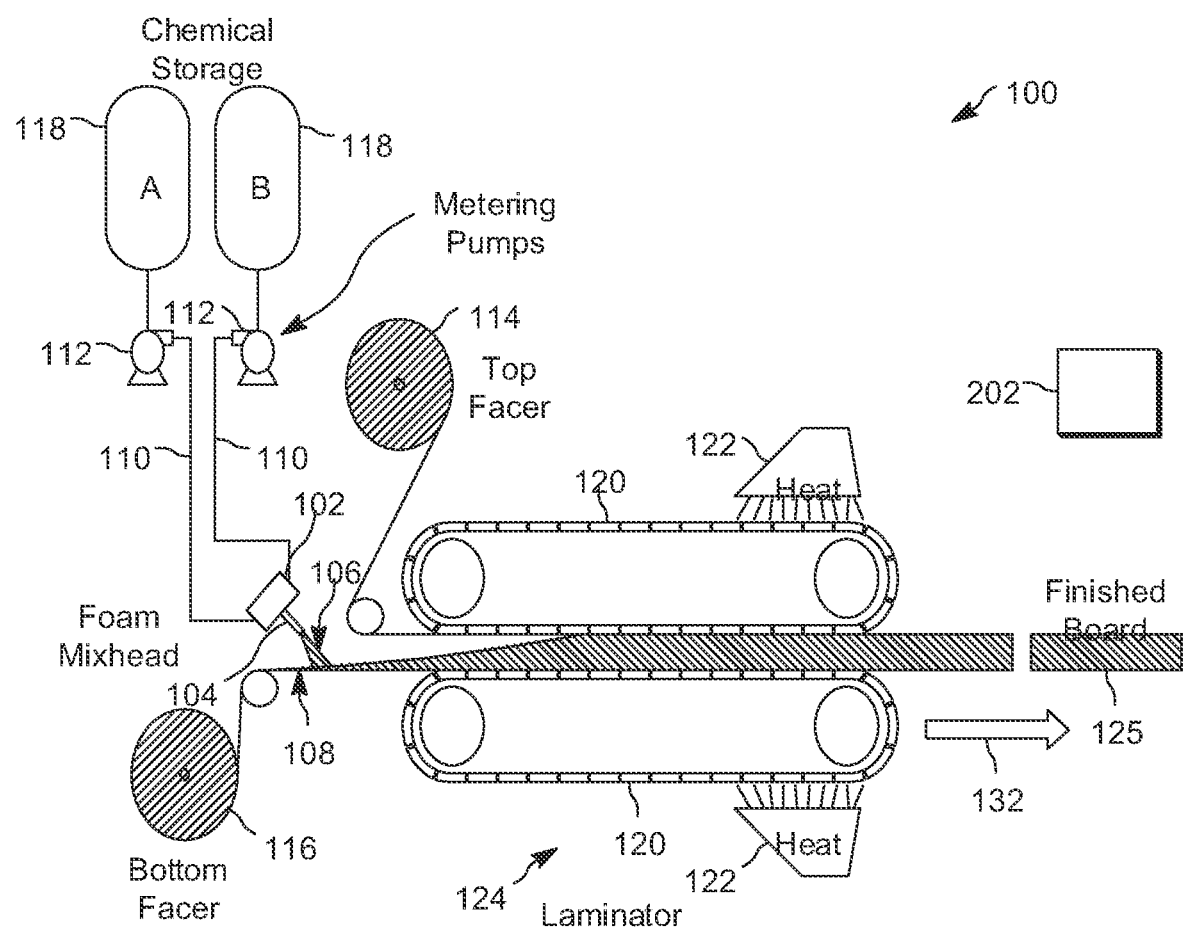
FIG. 1 shows an example system for manufacturing a foam board, in accordance with aspects of this disclosure.

The present technology relates to methods and systems to monitor and/or determine one or more characteristics of a manufactured board (e.g., thermal insulation board, restrained rise foam boards, free rise foam boards, bunstock, extruded plastic board, etc.). In particular, one or more sensors (e.g., a laser scanner, optical imaging system, etc.) may be arranged to measure one or more characteristics of the foam board and/or one or more constituent parts of the foam board. The measurements are provided to a control circuit and/or processor, which compare the one or more measured characteristics to one or more threshold characteristics.

Based on the comparison, the control circuit may be configured to adjust or otherwise control one or more operating parameters of the system. For example, the system for manufacturing a foam board can include an applicator to distribute one or more inputs (e.g., fluids, chemicals, gases, solids, or other materials) onto a substrate or facer advancing through a conveyance system (e.g., a conveyer belt, etc.). The system may adjust the distribution of those inputs (e.g., volume, speed, composition, location, angle, etc.) as well as an operating parameter of the conveyance system (e.g., speed, amount/location of applied heat, orientation of the substrate or facer relative to the direction of conveyance and/or location of the applied input, etc.) in response to the outcome of the comparison.

In some examples, the measured characteristics are compared against one or more thresholds (e.g., stored values, calculated values, etc.) associated with these characteristics. If the measured characteristic value falls outside a relevant threshold (e.g., a single value, a range of values), the control circuit can control the applicator, the conveyance system, and/or another component of the manufacturing system to adjust one or more operating parameters (e.g., associated with an input or other operating parameter) to correct for or mitigate issues to ensure the integrity of a manufactured board (e.g., a foam insulation board) is maintained.

During a manufacturing process, uneven application and/or distribution of inputs to manufacture the foam may compromise the integrity of the manufactured board, resulting in a finished product with degraded insulation performance, water accumulation issues, membrane adhesion failure, dimensional stability issues, decreased fire performance, and decreased compressive strength. Conventional methods of determining that an issue exists may be limited to a visual inspection of a limited portion of the finished board. For instance, an operator with significant training observes the way the applied fluids/chemical looks and the appearance of the finished board. The operator then manually adjusts, for example, a foam head to alter stream position or other processing parameters in a "best guess" effort to optimize production.

The results of such a limited visual observation would be used to determine the integrity of the entire board, and in some cases, the lot of boards represented by the tested sample board. Such a manual process is time and resource intensive, and the results are not representative of the integrity of the entire board or lot of boards. Moreover, at least due to the fact that such testing is conducted after a board has been completed, the testing may not be able to identify the particular input that caused the issue and/or how to adjust that input to correct for the issue. The result is a manufactured board where cost and quality are heavily dependent on operator attention and judgment.

By contrast, the disclosed manufacturing system employs sensors, such as video capture, a laser scanner, an infrared (IR) scanner, and/or a thermal scanner, at one or more stages of manufacturing to measure characteristics of the fluid application and/or the finished board in real-time. The measurements are provided to the control circuitry to determine whether an issue exists and, based on the determination, adjust one or more operating parameters during manufacturing of the board. The system is therefore configured to automatically adjust operating parameters based on sensor feedback and employment of one or more control algorithms, providing a more consistent operation, lower material and operational costs, and/or improved product quality.

Quality and cost of a manufactured foam board (e.g., a polyisocyanurate insulation board) is closely related to the manufacturing system's ability to distribute fluids (e.g., one or more liquid chemicals) evenly along a width or span of a substrate or facer advancing on a conveyor system. In particular, uneven distribution requires more raw material (which increases cost) and leads to performance failures. For example, uneven foam distribution requires more raw material to completely fill a board with expanding foam.

This disclosed systems and methods provide an accurate and responsive control for the distribution of the fluids by employment of a sensor(s), such as a laser, computer vision, optical imaging system, and/or thermal imaging, at a first stage of the manufacturing process. In examples, the sensor(s) (e.g., optical imaging system) detects characteristics associated with the quality of the fluids as applied to a substrate, and/or the dried final board appearance. In a listing of non-limiting examples, the characteristics monitored during the first stage (e.g., foam application) may include or be related to fluid stream location, volume of fluid deposited, width of the stream, rate of volume growth, temperature, presence/size/rate of growth of air bubbles, color, build-up of foam or rate of build-up, and/or breakage of the substrate/facer. At later stages of the manufacturing process (e.g., solid foam boards, cured/finished boards), additional or alternative characteristics may be monitored, such as knit lines, over—pack within the facers, under—fill within the facers, voids, wrinkles, and/or warping.

Based on the characteristic data, received via one or more sensors such as the optical imaging system, a control circuit can determine if one or more operating parameters should be adjusted. For example, a fluid applicator may be adjusted to change an angle or location of the stream on the substrate, fluid flowrates, fluid application pressure, fluid temperature, composition formulation (e.g., molar, etc.), constituent mass balance, etc. Further, operating parameters of an associated system may be adjusted, such as conveyor or laminator speed, line speed, laminator temperature, height, etc.

In some examples, one or more sensors are arranged to monitor characteristics of the fluid/inputs as well as the finished board/outputs. For instance, a first sensor (such as an optical vision system) is arranged to monitor an area of the substrate where foam is dispensed as it is advances through the conveyance system. A second sensor is arranged at a later stage of the manufacturing process, such as to inspect a solid foam or, in some examples, a finished foam board, to identify defects (e.g., knit lines in the facer, wrinkles, warping, foam over-pack, foam under—fill, voids, flatness, blow holes, thermal imaging profile, bowing/cupping, blisters, facer defects, facer misalignment, excess foam, thickness, etc.).

An algorithm can be employed to compare the sensor data to the predetermined values, identify differences, and adjust an operating parameter accordingly. In some examples, the algorithm comprises a feedback loop, which may employ machine learning or other artificial intelligence (AI) to provide control values for the various system components.

In some examples, a flatness and/or hardness (e.g., mechanical properties, density, etc.) tester is employed at a second stage (e.g., solid foam boards) to collect data to identify regions defined by peaks and valleys (e.g., a Z-axis deviation from the surface) of a finished board. The height of the peaks and the depth of the valleys are compared against one or more thresholds to determine regions as test locations in need of additional testing. In some examples, the results of the comparison can be used to adjust one or more of the operating parameters, such as application of the fluid streams, as disclosed herein. The additional tests can include, but are not limited to, determining one or more of a dimension (e.g., thickness), a mechanical property (e.g., compressive strength, etc.), and a density of the board at the region. The test can be performed by a multi-directional, motorized testing device affixed to a motorized carriage capable of traversing the surface of the board (e.g., across an X-Y plane perpendicular to the Z-axis). Additionally or alternatively, compressive strength may be tested across the Y-axis of the foam board, which may be considered for adjustment of one or more parameters (e.g., position or orientation of the applicator).

In some examples, sensor measurements from the first stage of the manufacturing process can be analyzed and/or compared in view of the sensor measurements from the second stage of the manufacturing process to determine an adjustment to a manufacturing process parameter. For example, a sensor measurement from the first stage (e.g., a scan of fluid streams prior to application of a second facer/substrate) may invoke an adjustment to a particular first parameter (e.g., adjustment of a position/orientation of an applicator). A sensor measurement from the second stage (e.g., a scan and/or flatness or hardness test of a finished board) may invoke an adjustment to another particular second parameter (e.g., adjustment of a fluid flow rate) and/or the first parameter. Additionally or alternatively, the control circuitry (e.g., via one or more algorithms) is configured to consider measurements from the first and second stages together. In such a case, the first and second parameter may be adjusted, as well as a third parameter (e.g., adjustment of conveyance speed). However, based on a comparison of the measurements from the first and second stages, the amount of adjustment of the first, second or third parameters may change, and/or implementation of one or more of the first, second or third parameters may be avoided. In some examples, sensors continue to monitor characteristics of a finally completed board (e.g., dried, cured board), and provides sensor data to the control circuitry 220 for analysis.

Through employment of the disclosed systems and methods, features that impact board quality may be improved, such as foam cost, edge collapse, dimensional stability (e.g., hot, cold, humid, dry), insulation value (k-factor/R-value), fire rating, cell orientation, among other outcomes, such that the quality and consistency of a lot of finished boards is assured.

As the monitoring and adjustment system is automated, the system is configured to "learn" and update threshold values through employment of artificial intelligence algorithms. In some examples, the algorithms may recognize signs that a particular operating parameter is trending toward an undesirable value, and implement control of a corresponding actuator, system or component. As a result, operators may commit less time monitoring the manufacturing process, and less training will be required of those who are tasked to monitor the system. Further, the collection of sensor data is used to inform best practices, which can be used across manufacturing systems and/or inform subsequent processes.

The presently described technology and its advantages will be better understood by reference to the following examples. These examples are provided to describe specific embodiments of the present technology. By providing these examples, the inventors do not limit the scope and spirit of the present technology.

In disclosed examples, a system for manufacturing a foam board includes an applicator to distribute one or more fluids onto a substrate, one or more sensors configured to measure one or more characteristics of the one or more fluids, and a controller configured to compare the one or more measured characteristics to one or more threshold characteristics, determine whether a characteristic of the one or more measured characteristics falls outside a threshold of the one or more threshold characteristics, calculate an amount of adjustment of the characteristic based on the one or more measured characteristics or the threshold in response to a determination that the characteristic falls outside the threshold, and generate a command corresponding to the amount.

In some examples, one or more control mechanisms are configured to adjust the one or more operating parameters of the system, wherein the one or more control mechanisms are configured for manual adjustment by an operator.

In examples, the controller is further configured to generate an indicator corresponding to the amount and to provide the indicator to a user interface configured for presentation to the operator.

In some examples, the controller is configured to adjust an operating parameter of the one or more operating parameters by a first amount if the characteristic exceeds a first threshold of the one or more threshold characteristics, and adjust the operating parameter by a second amount if the characteristic exceeds a second threshold of the one or more threshold characteristics.

In examples, the one or more operating parameters comprise one of a flow rate, a position or orientation of the applicator, a pressure, a temperature, conveyance speed, a composition formulation, or mass balance, and a position of a deposited fluid.

In some examples, the one or more sensors are configured to monitor an area of the substrate downstream from a point at which the one or more fluids contact the substrate.

In examples, a conveyance system to advance the one or more fluids and the substrate along a conveyor path, the one or more sensors configured to scan the one or more fluids as the substrate progresses along the conveyor path. In examples, the one or more sensors are configured to scan the one or more fluids along an axis that is perpendicular to a direction of the conveyor path.

In some examples, a conveyance system to advance the foam board along a conveyor path, the one or more sensors configured to scan the foam board as it progresses along the conveyor path. In examples, the one or more sensors are configured to scan the foam board along an axis that is perpendicular to a direction of the conveyor path.

In examples, the one or more sensors are configured to scan the foam board along multiple axes.

In some examples, the one or more sensors are secured to a moveable mount, the mount configured to adjust an orientation or position of the one or more sensors relative to the substrate.

In examples, the one or more sensors comprise one or more of a laser scanner, an optical imaging system, a hyperspectral imaging system, a near-infrared sensor, an infrared sensor, an ultrasound sensor, or a heat sensor.

In some examples, the one or more characteristics comprise one or more of a number of fluid streams, a location of the fluid on the substrate, a location of an edge of the fluid on the substrate, an angle at which the fluid contacts the substrate, a volume of the fluid on the substrate, a center of mass of the fluid on the substrate, a height of the fluid on the substrate, consistency of the fluid, temperature of the fluid.

In examples, the one or more characteristics comprise one or more of a rate of volume growth, a rate of width growth, a rate of height growth, a rate of change of the angle at which the fluid contacts the substrate, a rate of change in the center of mass, a rate of temperature increase.

In some examples, the one or more characteristics comprise one or more of a presence of air bubbles in the foam, presence of incomplete mixing, an anomalous color of the foam, inconsistent flow from the applicator, or foam build up on the substrate or applicator.

In examples, the one or more characteristics comprise one or more of a foreign object, alignment or location of the substrate, speed of conveyance, or fissure or compression of the substrate. In some examples, the one or more fluids react to generate a polyurethane or polyisocyanurate foam.

In some examples, the controller is further configured to apply a machine learning algorithm to generate the one or more thresholds.

In some examples, the controller is further configured to store the one or more measured characteristics to a memory storage device, calculate an average characteristic value based on the one or more measured characteristics over a predetermined amount of time, and generate the one or more thresholds based on the average characteristic value and one or more tolerance ranges.

In some disclosed examples, a system for manufacturing a foam board includes an applicator to distribute one or more fluids onto a substrate, one or more sensors configured to measure one or more characteristics of the one or more fluids, and a controller configured to compare the one or more measured characteristics to one or more threshold characteristics, and adjust a position or orientation of the applicator in response to a characteristic of the one or more measured characteristics falling outside a threshold of the one or more threshold characteristics.

In some examples, the one or more sensors include a first sensor configured to monitor an area of the substrate downstream from a point at which the one or more fluids contact the substrate. In examples, the one or more sensors include a second sensor configured to monitor a finished board.

In examples, the second sensor comprises one or more of a flatness tester, a hardness tester, a density tester, a laser scanner, an optical imaging system, a hyperspectral imaging system, a near-infrared sensor, an infrared sensor, an ultrasound sensor, or a heat sensor.

In some disclosed examples, a method of manufacturing a foam board includes measuring, by a sensor, one or more characteristics corresponding to distribution of one or more fluids applied to a substrate, receiving, at a control circuitry, data corresponding to the one or more characteristics, comparing, at the control circuitry, the one or more measured characteristics to one or more threshold characteristics, identifying, at the control circuitry, one or more operating parameters corresponding to the one or more measured characteristics, and adjusting one or more operating parameters in response to a characteristic of the one or more measured characteristics falling outside a threshold of the one or more threshold characteristics.

In some examples, the method includes adjusting an operating parameter of the one or more operating parameters by a first amount if the characteristic exceeds a first threshold of the one or more threshold characteristics, and adjusting the operating parameter by a second amount if the characteristic exceeds a second threshold of the one or more threshold characteristics.

In examples, the adjusting comprises adjustment of a control mechanism by an operator. In examples, the adjusting comprises adjustment of a control mechanism by a robotic device.

As disclosed herein, a "foam" or "foam insulation" can include, but is not limited to, polystyrene, polyurethane, polyisocyanurate, or phenolic.

As disclosed herein, a "bun-stock" is a large solid box-like structure formed during the production of polystyrene, polyurethane, or polyisocyanurate insulation.

FIG. 1 illustrates a system for manufacturing a foam board 100 (or a "laydown device"). As shown in FIG. 1, constituent fluid components A and B are provided from a chemical storage system 118. In some examples, the "A" component may include isocyanate, and the "B" component may include one or more of a polyol, a catalyst, an additive, and/or a blowing agent. In some examples, a third "C" component, such as pentane, can be used as a "blowing agent" which aids in expansion of the foam.

The flow of fluid is controlled by one or more valves and/or pumps 112, which may be controlled from a control circuit or processor. Conduits, manifolds, valves, or multiple connected pipes 110 provide the fluid(s) to a mix head 102, where constituent fluids are combined, reacted, and delivered via one or more applicators or nozzles 104, such as in the form of a foam. A combined fluid or foam 106 is distributed onto a substrate 108 (or bottom facer 116), with a position and/or orientation of the mix head 102 being controlled by the control circuitry, which governs application of the foam 106.

Application of the foam 106 via the applicator(s) 104 is to be distributed evenly across a width of the substrate 108 to ensure that the foam 106 expands and solidifies in an even, consistent manner as the foam 106 enters a conveyance system or laminator 124. Within the laminator 124, a top facer 114 is provided, the space between the substrate 108 and the top facer 114 being filled with foam 106 as it expands. Conveyor belts 120 drive the substrate 108 and the top facer 114 in a direction 132, to provide a finished board 125. In some examples, one or more heaters 122 are arranged within the manufacturing system 100 to control the heat of the foam 106, the facers 114, 116, which impacts the reaction time, adhesion properties, strength of one or more components of the board, as a list of non-limiting examples.

Proper application of the foam 106 is directly tied to the quality of the finished board 125. However, conventional systems rely on an operator's attention and/or judgment in monitoring the foam 106 applied to the substrate 108, typically relying on a visual determination as to the quality of the foam composition and/or distribution of the foam on the substrate 108. Commonly, multiple foam streams are applied to the substrate 108, each of which may have a different width, application angle, volume, flow rate, etc., which further complicates the process. Additionally or alternatively, clogs may occur at the applicator(s) 104, which further impacts quality and cost of the finished board 125.

In some examples, a second operator inspects the finished board 125 for defects (e.g., under-filling of the board, over-filling of the board, tears, wrinkles, voids, etc.). The second operator communicates with the first operator at the mix head 102 regarding suggested adjustments to the application, such as a change in position or orientation of the applicator 104, rate of flow, combined fluid composition, etc. This process is reliant on multiple skilled operators, who must constantly monitor and evaluate the manufacturing process, which may produce hundreds of finished boards (e.g., 10 to 300 feet of finished foam board per minute). The result is often a lagging identification of issues in a solid foam board and/or finished product, such that corrections are slow to be made, with entire lots being scrapped before the manufacturing process is corrected.

Figure 2:
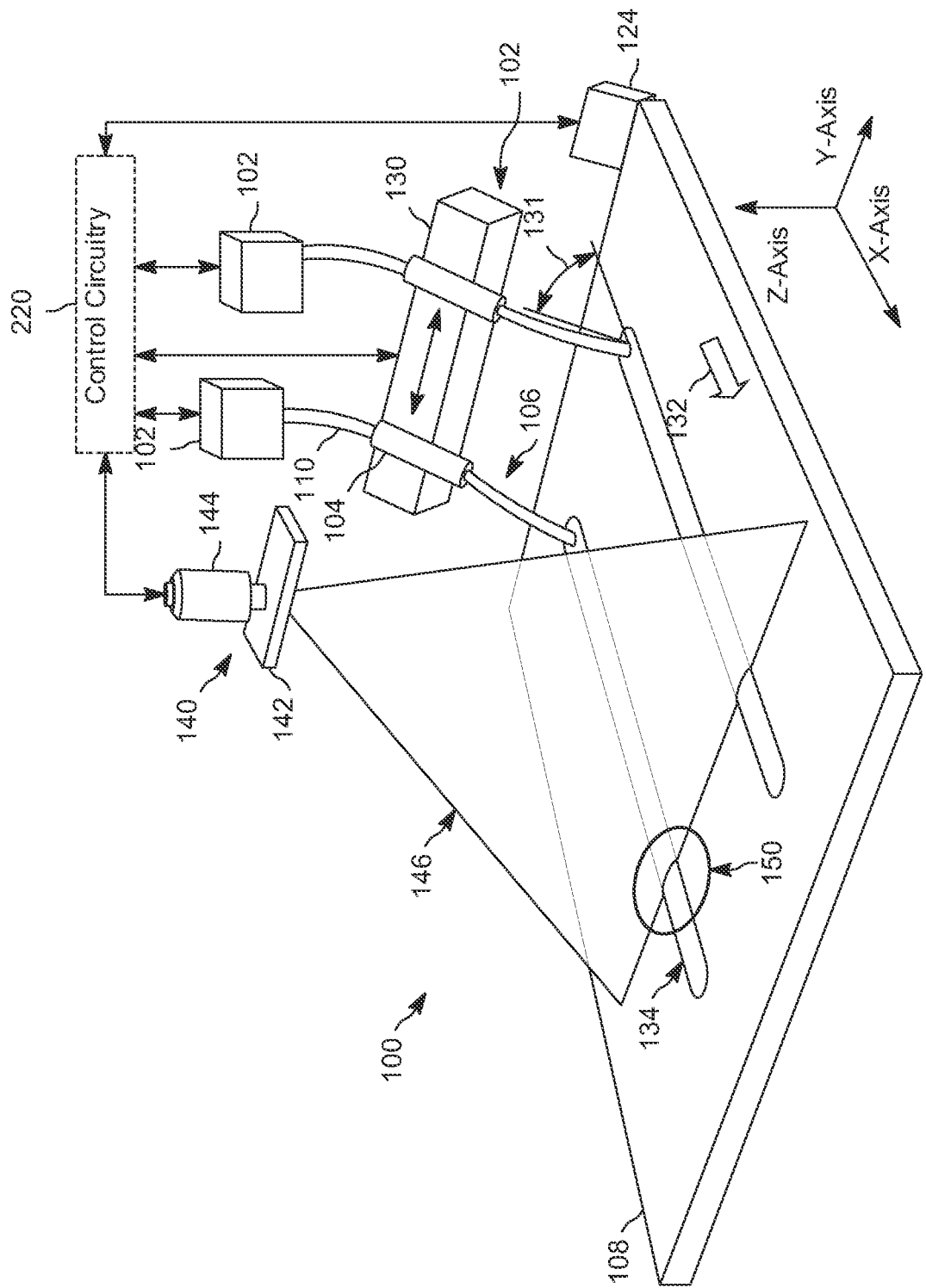
FIG. 2 shows another example system for manufacturing a foam board, in accordance with aspects of this disclosure.

FIG. 2 illustrates an example system for manufacturing a foam board 100 with one or more integrated sensor(s) 140 and/or adjustable components (e.g., sensor 140, actuator 144, conveyance system 124, etc.), which provides a solution to the many issues of producing a cost effective, high quality foam board. As shown in FIG. 2, sensor(s) 140 are located at one or more locations along the path of manufacture to monitor one or more characteristics of the fluid, foam, substrate, facers, finished board, and/or one or more components of the system 100 at one or more stages of the manufacturing process. By use of sensor(s) 140, measured characteristics may be communicated to a control circuitry 220, which is configured to analyze the characteristics, compare those characteristics against one or more thresholds, and/or control adjustment of one or more parameters associated with the one or more components to correct for undesirable outcomes.

The sensor 140 may include one or more measuring devices 142, which may include one or more of a laser scanner, an optical imaging system, a hyperspectral imaging system, a near-infrared sensor (NIR), an infrared sensor (IR), an ultrasound sensor, or a heat sensor, as a list of non-limiting examples.

The sensor 140 and/or the measuring device 142 may be mounted to a motorized carriage or other actuator 144 configured to move the sensor 140 or device 142 at any position or orientation with respect to the system 100. Accordingly, the measuring device 142, and the sensor 140, can navigate in three-dimensional space above the system 100. In some examples, the sensor 140 is mounted remotely from the measuring device 142, which may provide varying perspectives and/or optimize measurement of a particular characteristic.

Data collected via the sensors 140 is transmitted to the control circuitry 220. For instance, the data may correspond to one or more characteristics of the foam 106 or resulting streams 134, such as fluid stream location, volume of fluid deposited, width of the stream, rate of volume growth, temperature, presence/size/rate of growth of air bubbles, color, build-up of foam or rate of build-up, as well as characteristics of the substrate 108/facers 114/116, such as breakage of the substrate/facer, knit lines, over—pack within the facers, under—fill within the facers, voids, wrinkles, and/or warping, as a list of non-limiting examples.

Based on the characteristic data, received from one or more sensors 140, the control circuitry 220 can determine if one or more operating parameters should be adjusted. For example, a fluid applicator 104 may be adjusted to change an angle or location of the stream on the substrate 108, fluid flowrates, fluid application pressure, fluid temperature, composition balance, etc. In some examples, the flow from the metering pumps 112 may be adjusted, the position or orientation of the applicator 104 relative to the substrate 108 and/or another applicator may be adjusted, which controls the distribution and/or composition of the foam 106 being applied to the substrate 108.

Further, one or more sensor(s) 140 may monitor operating parameters of an associated system, such as the conveyance system 124. Data corresponding to one or more parameters of the conveyance system 124 may additionally or alternatively be adjusted, such as conveyor or laminator speed, line speed, laminator temperature, height between facers, etc.

As shown in a non-limiting example of FIG. 2, a scan 146 (such as a laser or optical scan, a three-dimensional camera, a two-dimensional camera, or multiple lasers and/or cameras) is projected from measuring device 142 onto a surface of the board during the manufacturing process. In some examples, the sensor 140 may employ a single camera, or multiple cameras for an increased field of view. Additionally or alternatively, the imaging systems can be used to stich multiple images together from multiple angles and/or sensors to render a three-dimensional image, an image with multiple types of imaging incorporated (e.g., in the optical spectrum, NIR, IR, etc.) to generate a composite image.

The location and/or lighting for the sensor 140 are closely related to performance of the sensor 140. For instance, natural or environmental light may have too much variation, so system performance changes at different times of day. Controlled artificial and/or structured light (e.g., lasers, generated monochromatic and/or polychromatic light, etc.) can have a positive impact on system performance. The sensor 140 may be positioned to provide a scan with a predetermined alignment, such as on a predetermined axis or one or more predetermined multiple axes relative to the direction of conveyance, which may be particular to the area of the conveyance system being monitored and/or based on the stage of the manufacturing process.

Due to the nature of the manufacturing process (such as the use of volatile chemicals), systems and technologies employed may be provided with shields, coatings, and/or other features to protect the various system components (e.g., from impact, high temperatures, etc.). The actuators, robotic arms, metals, bearings, gears, motors, carriages, etc., used for the various systems may also employ one or more such features to prevent contamination and/or impacts. Some equipment is subject to foam buildup, which can be mitigated by employing a cover over the moving components. The camera may have a stream of fluid (e.g., air) that can be used to deflect foam droplets from hitting a lens, for instance.

Data corresponding to the monitored parameters (e.g., foam height, consistency, rate of growth, etc.) is transmitted from the sensor 140 to the control circuitry 220 in a feedback loop, where it is analyzed via one or more algorithms to determine foam volume, height, and/or location on the substrate 108 and/or relative to other foam streams. The results from the algorithm (e.g., volume of the stream 134 edges at the left or right, rate of volume growth fill at a specific time/location through the manufacturing process, etc.) instruct the control circuitry 220 as to whether the fluid application is to be adjusted, such that actuators 130 (e.g., secured to one or more mounts arranged above the substrate 108) adjust the position or orientation of the one or more applicators 104 to a desired set point. For instance, the actuators 130 may move the applicators 104 in one or more of six-axis direction (forward/back, left/right, up/down, pitch, yaw, roll) to adjust the stream 134. As a result, the foam stream(s) 134 are distributed more evenly.

In some examples, the system 100 may include one or more control mechanisms 127, configured to adjust the one or more operating parameters corresponding to one or more components of the system 100 (e.g., mix head 102, applicator(s) 104, pipes 110, valves and/or pumps 112, laminator 124, etc.). For example, the one or more control mechanisms 127 can include one or more of a user interface, such as user interface 124, a lever, a tube, a handle, a button, a mount, a jig, a knob, a switch, etc., which are configured for manual adjustment by an operator. Further, the control circuitry 220 generates an indicator corresponding to the amount of adjustment, and to provide the indicator to the display 126 or other user interface 214 for presentation to the operator to inform the manual adjustment.

In some examples, the control circuitry 220 is configured to submit information (e.g., sensor data) for presentation to an operator. The information can be alphanumerical, graphical, tonal, etc., to inform the operator as to the status of the manufactured board and/or the manufacturing process. In examples, a display can present the information as a graphic illustrating one or more components of the system, which may present relative and/or comparison images of measured and desired parameters (e.g., position and/or orientation of an applicator). The images may include text, graphics, or other indicators to draw the operator's attention to an area of interest and/or instruct the operator to address an identified issue. The instructions may include a movement (e.g., an adjustment to position and/or orientation of the applicator, a speed of conveyance, etc.), and/or adjustment to fluid composition in accordance with a desired output.

Further, the display may present an image of a manufactured board at one or more stages of the manufacturing process. The display may identify areas (e.g., on a surface of the board) that have been determined to correspond to one or more characteristics that lie outside of a desired range or threshold, as disclosed herein.

Although a single sensor 140 is illustrated in FIG. 2, multiple sensors of varying types may be used from a single location, from multiple locations, from a variety of perspectives, measuring common and/or different parameters, simultaneously, periodically, and/or at particular intervals during the manufacturing process to collect impactful data as needed to ensure proper control of the various systems and subsystems disclosed herein.

Figure 3:
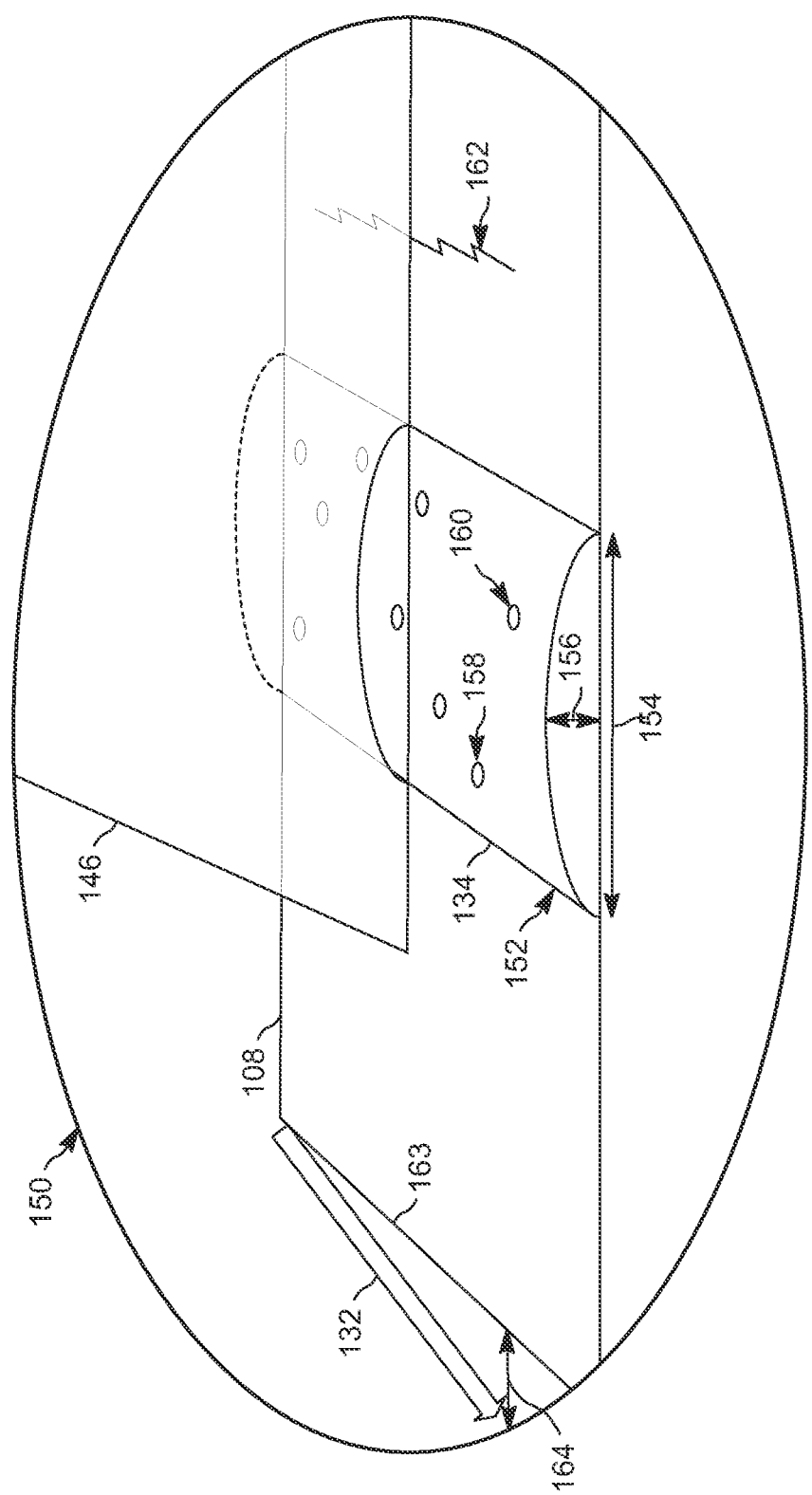
FIG. 3 shows an example detailed view of a foam stream and substrate during a manufacturing process, in accordance with aspects of this disclosure.

FIG. 3 illustrates an example detailed view 150 of a foam stream 134 and substrate 108 being monitored by a scan 146 from sensor 140 during a manufacturing process. As shown, scan may be provided as a linear scan along a width of the substrate 108, although multiple linear scans may be employed, along a width or at any other angle relative to the direction of travel 132. Further, the scan be focused on a particular feature of the process (e.g., the foam stream 134) or may be expanded beyond edges 163 of the substrate 108.

The sensor 140 thus measures one or more characteristics of the foam and/or board, a number of fluid 134 streams, a location of the fluid 134 on the substrate 108, a location of an edge 152 of the fluid 134 on the substrate 108, an angle 131 at which the fluid 134 contacts the substrate 108, a rate of change of the angle 131 at which the fluid contacts the substrate, a volume of the fluid 134 on the substrate 108, a rate of volume growth, a center of mass of the fluid 134 on the substrate 108, a rate of change in the center of mass, a width 154 of the fluid 134, a rate of width 154 growth, a height 156 of the fluid 134 on the substrate 108, a rate of height 156 growth, consistency of the fluid 134, temperature of the fluid 134, a rate of temperature change, a presence of air bubbles 160 in the foam, presence of incomplete mixing, an anomalous color of the foam, inconsistent flow from the applicator, or foam build up on the substrate or applicator, a foreign object 158, alignment or location 164 of the substrate 108 relative to the direction of travel 132, speed of conveyance, or fissure or compression 162 of the substrate 108, as a non-limiting list of examples.

Measurements from the sensor 140 can be transmitted to a control circuitry 220, via a wired or wireless channel. The control circuitry 220 uses the measurements to identify issues with the manufacturing process, as well as identifying adjustments to corresponding components to correct for such issues.

For example, a measured characteristic can be compared against a stored, optimized characteristic, such as maintained in a listing of threshold values stored within a memory 222 of the control circuitry 220. If the difference is within a suitable tolerance, the measured characteristic will not be classified as a defect. However, if the measured characteristic lies outside the threshold range, the control circuitry 220 will designate the characteristic as a defect. The measured characteristic may then be applied against a second threshold(s), which may determine if an adjustment is required.

For instance, if the volume of fluid on the substrate is above a desired threshold level, yet the flow rate is decreasing at a suitable rate, the algorithm may determine no adjustment is needed and the system continues to monitor the process. However, if, in the present example, the volume of fluid is above the desired threshold level, and the flow rate is stable or increasing, the algorithm may determine an adjustment is needed to the pump 112 or a valve position (to adjust the flow rate), to the mix head 102 (to adjust a composition balance), to a heater (to adjust the temperature), to the conveyance system (to adjust the speed), as a list of non-limiting examples. If a defect is identified and/or an adjustment is made, additional testing can be performed at later stages of the manufacturing process to determine if the adjustment has provided the intended result.

In some examples, a finished board 125 can be subjected to additional testing at a testing station configured to measure the characteristics described herein, as well as the flatness and/or hardness of the board as it passes the station. In such a case, a sensor (such as a laser scan) can scan the foam and/or board throughout the manufacturing process, communicate this information to the control circuitry 220, which can then identify features and/or regions if the board that may require further testing (e.g., such as an additional scan, testing a finished board 125 for compressive strength, etc.), as described herein. In some examples, the control circuitry 220 generates coordinates to direct additional testing system(s) to the identified features and/or regions.

For boards that require additional testing, another testing station can be located along the conveyor system. Coordinates can be provided to one or more devices at the second testing station to locate the regions that have been identified as requiring additional testing. The additional testing can be conducted by a flatness and/or hardness test, performed by a computer numerical control (CNC) tester, for example. Additionally or alternatively, compressive strength can be measured manually, and/or with non-invasive testing apparatuses (e.g., laser scan, optical scan, NIR scan, IR scan, ultrasound, etc.), or another measurement device. In some examples, the conveyor system can direct boards that require additional testing to the second testing station, whereas boards without identified defects advance to a finishing and/or packaging area.

All testing systems, techniques, and applications may provide inputs that can adjust any parameter output, and no single testing system, technique, or application is limited to a single parameter.

Based on the results from the scan and/or the compressive strength testing, one or more parameters of the manufacturing system can be adjusted to correct measured defects. Non-limiting examples include the temperature of the applied material, the fluid flowrate, fluid pressure, position or orientation of the fluid applicator, the deposition volume, and/or the position of the board on the manufacturing line, which can be adjusted to mitigate the presence of defects in the completed boards. In some examples, the board can be given a quality score, with an alert being provided to a user, the board being marked, or other suitable method.

In some examples, the system 100 can be controlled by manually programming the control circuitry 220, including modification to the threshold values, as well as directing the sensor 140 and/or other testing devices to a desired location throughout the process and/or on the board 125. For example, a testing platform can be integrated into an online manufacturing process. An online process is characterized by a continuous flow of completed boards through one or more service or test stations. For example, the conveyor system 124 can advance a completed board 125 to a testing station.

Figure 4:
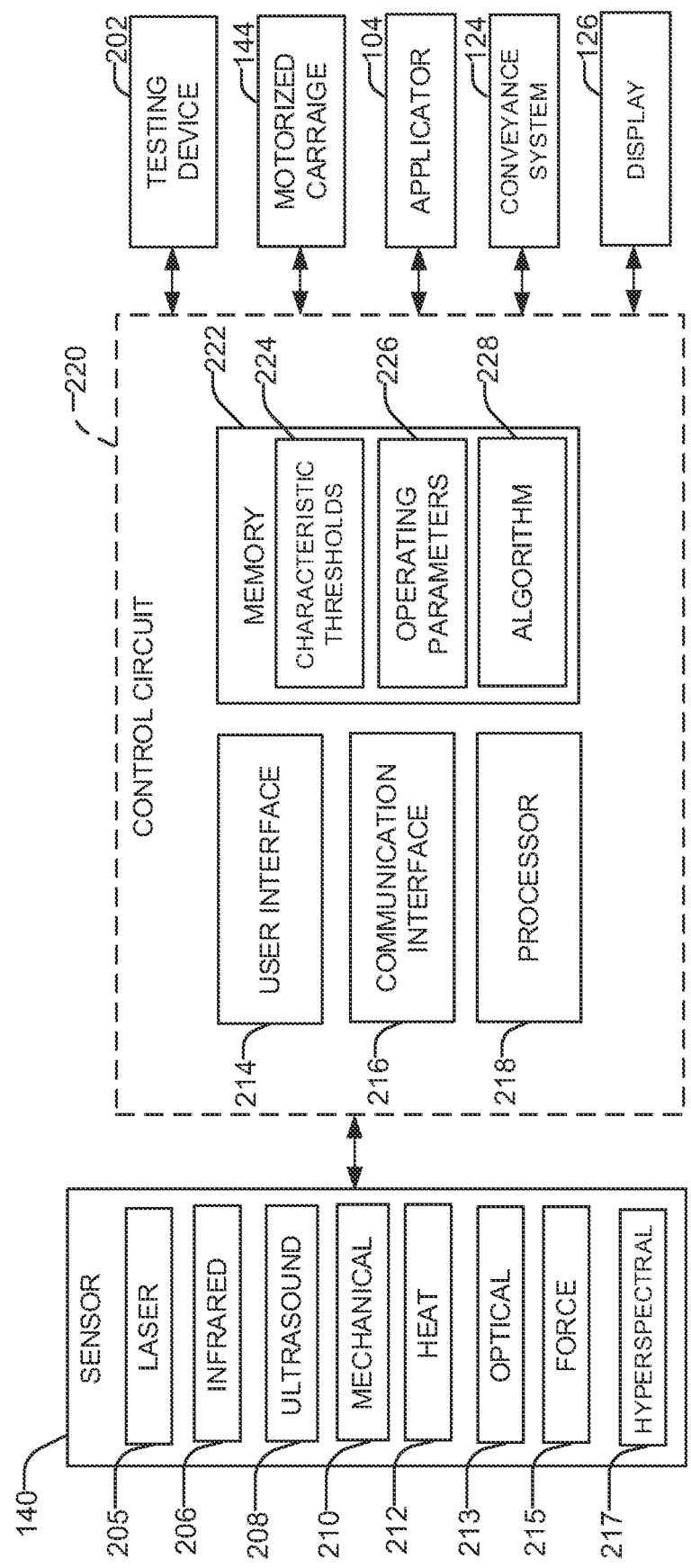
FIG. 4 is a block diagram of an example control circuitry for a system for manufacturing a foam board, in accordance with aspects of this disclosure.

FIG. 4 shows a block diagram of an example implementation of a control circuitry 220. The control circuitry 220 includes a communication interface 216 to transmit information to and receive information from one or more systems, sensors, devices and/or components. The interface 216 is operatively connected to a user interface 214, a processor 218, a memory 222, as well as sensor 140, testing device or system 202 (e.g., a flatness and/or hardness tester), a motorized carriage 144, the applicator 104, a conveyance system 124, and a display 126. The sensor 140 can include one or more of a laser scanner 205, an IR sensor 206, an ultrasound sensor 208, a mechanical sensor 210, a heat sensor 212, an optical imaging system 213 (e.g., a vision type camera), a force or pressure sensor 215, and/or a hyperspectral imaging system 217, as a list of non-limiting examples.

The example control circuitry 220 of FIG. 4 includes processor 218 capable of executing computer readable instructions, including one or more artificial intelligence or machine learning algorithms (e.g., neural networks, deep learning, etc.) and may be a general-purpose computer, a laptop computer, a tablet computer, a mobile device, a server, a Head's Up Display (HUD), a virtual or augmented reality display (VR/AR), and/or any other type of computing device integrated or remote to the system 100. In some examples, the control circuitry 220 is implemented in a cloud computing environment, on one or more physical machines, and/or on one or more virtual machines and/or containers.

In some examples, the HUD or VR/AR display may present content associated with the sensors 140 and/or the testing device 202 on the display 126. For instance, measurements can be presented visually (such as an overlay, graphic, text, etc.) superimposed on an image of the manufacturing system 100 (e.g., a captured image and/or a computer generated graphic). In some examples, the operator may view the superimposed measurements and direct adjustments in an associated parameter, such as by making changes via user interface 214. For instance, the proposed changes may be visible on the display 126 prior to implementation, to ensure the change produces a desired result.

The memory 222 contains a matrix or other listing of threshold characteristic values 224, a matrix or other listing of operating parameter values 226, as well as one or more algorithms 228. For example, the control circuitry 220 is configured to access the memory 222 storing the lists of values 224, 226, and the algorithms 228. In some examples, the control circuitry 220 and the memory 222 are integrally located (e.g., within a computing device). In some examples, the control circuitry 220 is connected to a network interface to access the lists of values 224, 226, and/or algorithms 228 via a communications network.

In some examples, the memory device 222 or another memory device may include volatile or non-volatile memory, such as ROM, RAM, magnetic storage memory, optical storage memory, or a combination thereof, and may be integrated with the control circuitry 220, located remotely, or a combination of the two. In addition, a variety of control parameters (e.g., for operating the sensor 140, the testing device 202, the motorized carriage 144, the applicator 104, and/or the conveyance system 124) may be stored in the memory device 222 along with code configured to provide a specific output during operation of the system 100.

The control circuitry 220 is configured to receive one or more characteristic measurements to determine the integrity of a board. For example, the sensor 140 scans the board to measure such characteristics, the data of which is sent to the control circuitry 220, which may utilize a look up table, an algorithm, and/or a model stored in the memory device 222 to determine the integrity of the board based on a comparison between the measured characteristic and the values stored in memory 222. For example, the control circuitry 220 compares the measured foam characteristics (e.g., height, flow rate, temperature, expansion rate, etc.) against threshold values 224 stored in the memory 222 to determine if the measurements lie outside a suitable threshold. In some examples, the threshold values 224 include a set value or a rate of change (be it increasing or decreasing), that may be considered with respect to another related value (e.g., application volume and conveyor speed), all of which may be adjusted by an operator or as a result of a machine learning update.

Based on the comparison, the control circuitry 220 can determine whether an adjustment is to be performed, and/or if alternative or additional testing is required. If an adjustment is needed, the control circuitry 220 accesses a listing of operating parameters 226, which may correspond to one or more characteristic threshold values 224. Based on the relationship between the characteristics and the parameters, the control circuitry 220 may employ the algorithms to determine a type and/or amount of adjustment required by a particular system.

If additional testing is needed, the control circuitry 220 can identify a characteristic and/or area of the board for the sensor 140 and/or testing device 202 to perform additional testing. Accordingly, the information regarding any defect can be compiled and compared to one or more stored quality characteristic values, to generate a score, an alert, or instructions for modification to the manufacturing system 100.

In an example, the control circuitry 220 determines a type and severity of a defect in the board 125, and provides the information to the manufacturing system 232. One or more operating values 226 (e.g., a flow rate, a pressure, a temperature, position of a deposited substance, position of the stream, conveyor speed, etc.) of the manufacturing system 100 can then be adjusted to ensure the defect is corrected through the manufacturing process.

Based on the collected measurements, any adjustment required to an operating parameter value can be determined empirically. In some examples, the control circuitry 220 is configured to interpolate a correction to an operating value. The operating parameter value can then be adjusted to correct the defect, as described herein. The control circuitry 220 may calculate, employ an algorithm, a model stored in the memory device 222, or apply one or more machine-learning techniques to determine a desired adjustment.

The algorithm(s) employed by the system 100 to determine defects and/or to control parameters are not limited to a particular type and/or application, and may employ a single algorithm or multiple algorithms, which may be applied simultaneously, periodically, sequentially, and/or in response to a particular trigger. For instance, if an absolute value of a measured characteristic is identified as being within a corresponding threshold limit, yet the rate of change exceeds a corresponding threshold, the control circuitry 220 may continue to monitor the characteristic and/or apply additional algorithmic processing to ensure an issue does not arise or is mitigated.

Example algorithms related to detecting single location features of foam streams (e.g., number of foam streams, three-dimensional location, edge locations, contact angle, volume, center of mass based on volume, height, consistency, temperature, etc.) and multi-location features of the foam stream or wave measurements (e.g., rate of volume growth, rate of width growth, rate of height growth, rate of contact angle change, rate of center of mass change, etc.) may include, but are not limited to, one or more of a principal component analysis, partial least squares, discriminant analysis, Canny edge detector, ridge detection, blob detector (i.e. Laplacian of the Gaussian), and/or semi-empirical models (e.g., involving chemical reaction kinetics, fluid mechanics, thermodynamics, mass transfer, and space filling).

Example algorithms related to detecting processing issues that impact foam integrity (e.g., presence of air bubbles, presence of bad mixing, color of foam, blockages/clogging of the applicator, buildup of foam within the field of view, etc.), and detecting features independent of the foam that impact foam board production (e.g., foreign object detection, location of facer/substrate such as alignment, conveyor speed, breakage of the facer/substrate, etc.) may include, but are not limited to, one or more of Bayes classifiers, support vector machines, decision trees, boosting, neural networks, radial basis function network, clustering, K-nearest neighbors, deep learning, linear regression, multiple linear regression, ensemble techniques, cost-sensitive learning, principal component analysis, You Only Look Once (YOLO), Region-based convolution neural networks (R-CNN), and/or Single Shot Detector (SSD).

Additionally or alternatively, the control circuitry 220 may receive input from the user interface 214 configured for inputting commands and/or customizing controls (e.g., via graphical user interfaces (GUI), touch screens, communication pathways, etc.).

Figure 5:
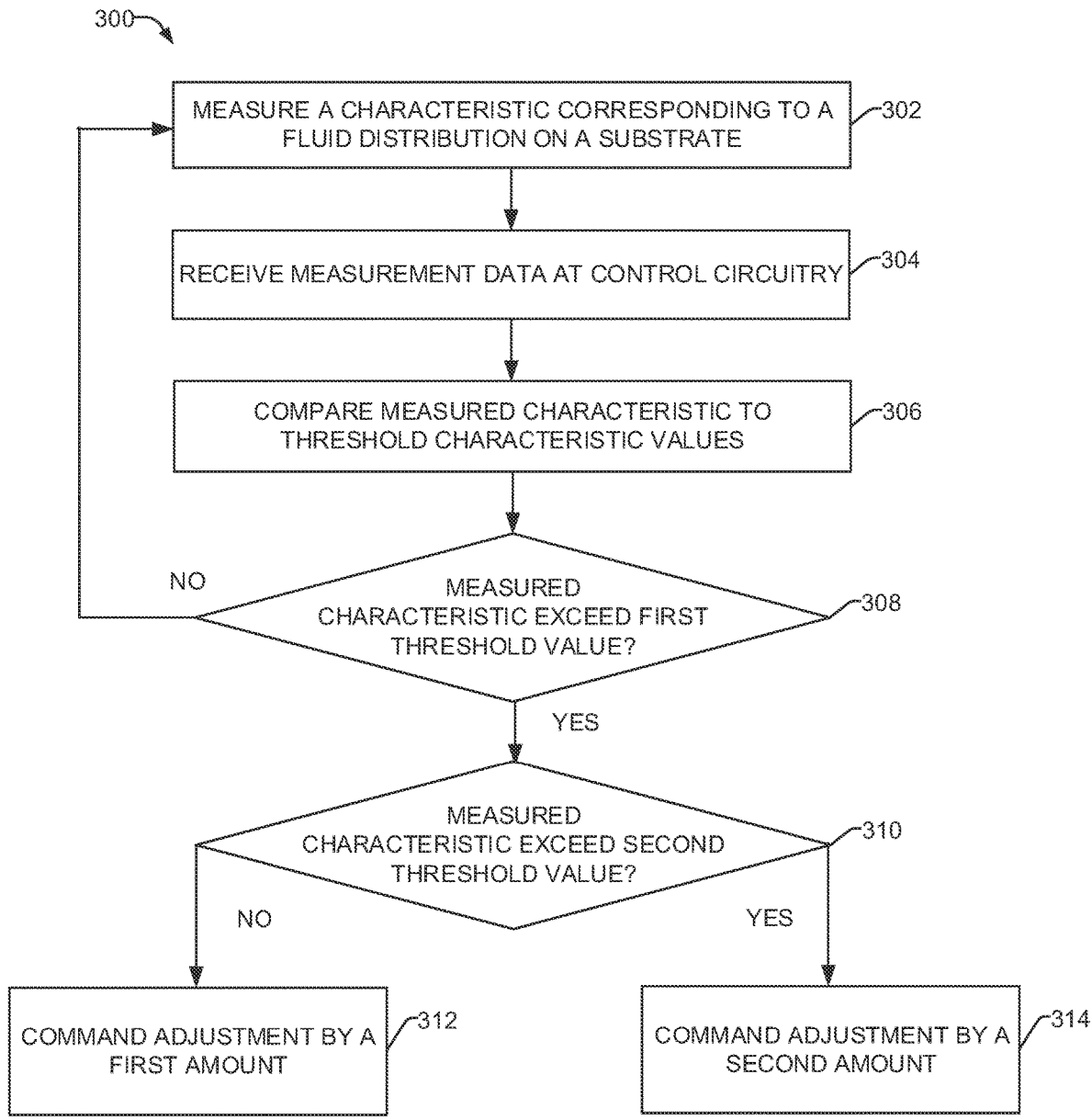
FIG. 5 illustrates an example method of operating a system for manufacturing a foam board, in accordance with aspects of this disclosure.

FIG. 5 is a flowchart representative of example machine readable instructions 300 which may be executed by the control circuitry 220 of FIGS. 2 and 4 to determine a characteristic of a manufactured board (e.g., board 125) and adjust an operating value, or provide information regarding adjustment of a characteristic, of a manufacturing system (e.g., manufacturing system 100), in accordance with the examples provided in FIGS. 1 to 4.

At block 302, one or more characteristics corresponding to distribution of one or more fluids (e.g., fluids or foam 106) applied to a substrate (e.g., substrate 108) are measured by a sensor (e.g., sensors 140). At block 304, data corresponding to the one or more characteristics is received at a control circuitry (e.g., control circuitry 220). At block 306, the one or more measured characteristics is compared to one or more threshold characteristics at the control circuitry.

Based on the comparison, the control circuitry determines if a measured characteristic has exceeded a threshold characteristic level. For example, at block 308, the control circuitry may determine that the measured characteristic has exceeded a first, low threshold characteristic level, and determined that either no adjustment is needed or a first, minor adjustment is needed. If the first threshold characteristic level has not been exceeded, the method returns to block 302 and continues to measure the one or more characteristics.

However, if the first threshold characteristic level has been exceeded, the method continues to block 310, where the control circuitry determines if the measured characteristic exceeds a second, greater threshold characteristic level. For example, the first threshold may have a range of 5% beyond a predetermined target value, and the second threshold may have a range of 10% beyond the predetermined target value.

If the measured characteristic has exceeded the first threshold characteristic level but not exceeded the second, greater threshold characteristic level, the method proceeds to block 312, an adjustment command is triggered. For example, an amount of a first adjustment of one or more operating parameters can be generated by the control circuitry and provided to an operator (e.g., via a display or other user interface). In some examples, the control circuitry can command a first adjustment of the one or more operating parameters (e.g., a position or orientation of applicator 104), such as to a robotic device, one or more actuators, and/or other system components driving the manufacturing process.

If the measured characteristic has exceeded the second threshold characteristic level (and the first threshold characteristic level), the method proceeds to block 314, where another adjustment command is triggered. For example, an amount of a second adjustment of one or more operating parameters can be generated by the control circuitry and provided to the operator. In some examples, the control circuitry can command the second adjustment of the one or more operating parameters (e.g., a position or orientation of applicator 104).

The present methods and systems may be realized in hardware, software, and/or a combination of hardware and software. Example implementations include an application specific integrated circuit and/or a programmable control circuit.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A system for manufacturing a foam board comprising:
    an applicator to distribute one or more fluids onto a substrate;
    one or more sensors configured to scan a stream of the one or more fluids on the substrate and to measure one or more characteristics of the one or more fluids prior to solidification of the one or more fluids; and
    a controller configured to:
        compare the one or more measured characteristics to one or more threshold characteristics;
        determine whether a characteristic of the one or more measured characteristics falls outside a threshold of the one or more threshold characteristics;
        calculate an amount of adjustment of the characteristic based on the one or more measured characteristics or the threshold in response to a determination that the characteristic falls outside the threshold; and
        generate a command corresponding to the amount.

2. The system for manufacturing of claim 1, further comprising one or more control mechanisms configured to adjust one or more operating parameters of the system, wherein the one or more control mechanisms are configured for manual adjustment by an operator.

3. The system for manufacturing of claim 2, wherein the controller is further configured to generate an indicator corresponding to the amount and to provide the indicator to a user interface configured for presentation to the operator.

4. The system for manufacturing of claim 1, wherein the controller is further configured to:
    adjust an operating parameter of one or more operating parameters by a first amount if the characteristic exceeds a first threshold of the one or more threshold characteristics; and
    adjust the operating parameter by a second amount if the characteristic exceeds a second threshold of the one or more threshold characteristics.

5. The system for manufacturing of claim 4, wherein the one or more operating parameters correspond to a first stage of a multi-stage manufacturing process and comprises one of a flow rate, a position or orientation of the applicator, a pressure, a temperature, conveyance speed, a composition formulation, or mass balance, and a position of a deposited fluid.

6. The system for manufacturing of claim 1, wherein the one or more sensors are further configured to monitor an area of the substrate downstream from a point at which the one or more fluids contact the substrate.

7. The system for manufacturing of claim 1, further comprising a conveyance system to advance the one or more fluids and the substrate along a conveyor path, the one or more sensors further configured to scan the one or more fluids as the substrate progresses along the conveyor path.

8. The system for manufacturing of claim 7, wherein the one or more sensors are further configured to scan the one or more fluids along an axis that is perpendicular to a direction of the conveyor path.

9. The system for manufacturing of claim 1, further comprising a conveyance system to advance the foam board along a conveyor path in a later stage of the manufacturing process, the one or more sensors further configured to scan the foam board as it progresses along the conveyor path.

10. The system for manufacturing of claim 9, wherein the one or more sensors are further configured to scan the foam board along an axis that is perpendicular to a direction of the conveyor path.

11. The system for manufacturing of claim 9, wherein the one or more sensors are further configured to scan the foam board along multiple axes.

12. The system for manufacturing of claim 1, wherein the one or more sensors are secured to a moveable mount, the mount configured to adjust an orientation or position of the one or more sensors relative to the substrate.

13. The system for manufacturing of claim 1, wherein the one or more sensors comprise one or more of a laser scanner, an optical imaging system, a hyperspectral imaging system, a near-infrared sensor, an infrared sensor, an ultrasound sensor, or a heat sensor.

14. The system for manufacturing of claim 1, wherein the one or more characteristics comprise one or more of a number of fluid streams, a location of the fluid on the substrate, a location of an edge of the fluid on the substrate, an angle at which the fluid contacts the substrate, a volume of the fluid on the substrate, a center of mass of the fluid on the substrate, a height of the fluid on the substrate, consistency of the fluid, temperature of the fluid.

15. The system for manufacturing of claim 1, wherein the one or more characteristics comprise one or more of a rate of volume growth, a rate of width growth, a rate of height growth, a rate of change of the angle at which the fluid contacts the substrate, a rate of change in the center of mass, a rate of temperature increase.

16. The system for manufacturing of claim 1, wherein the one or more characteristics comprise one or more of a presence of air bubbles in the foam, presence of incomplete mixing, an anomalous color of the foam, inconsistent flow from the applicator, or foam build up on the substrate or applicator.

17. The system for manufacturing of claim 1, wherein the one or more characteristics comprise one or more of a foreign object, alignment or location of the substrate, speed of conveyance, or fissure or compression of the substrate.

18. The system for manufacturing of claim 1, wherein the one or more fluids react to generate a polyurethane or polyisocyanurate foam.

19. The system for manufacturing of claim 1, wherein the controller is further configured to apply a machine learning algorithm to generate the one or more thresholds.

20. The system for manufacturing of claim 1, wherein the controller is further configured to:
store the one or more measured characteristics to a memory storage device;
calculate an average characteristic value based on the one or more measured characteristics over a predetermined amount of time; and
generate the one or more thresholds based on the average characteristic value and one or more tolerance ranges.

21. A system for manufacturing a foam board comprising:
an applicator to distribute one or more fluids onto a substrate during a liquid chemical application stage of a manufacturing process;
one or more sensors configured to scan a stream of the one or more fluids on the substrate and to measure one or more characteristics of the one or more fluids prior to solidification of the one or more fluids; and
a controller configured to:
compare the one or more measured characteristics to one or more threshold characteristics; and
adjust a position or orientation of the applicator in response to a characteristic of the one or more measured characteristics falling outside a threshold of the one or more threshold characteristics.

22. The system for manufacturing of claim 21, wherein the one or more sensors include a first sensor configured to monitor the one or more fluids prior to solidification at an area of the substrate downstream from a point at which the one or more fluids contact the substrate.

23. The system for manufacturing of claim 22, wherein the one or more sensors include a second sensor configured to monitor a finished board in a later stage of the manufacturing process.

24. The system for manufacturing of claim 23, wherein the second sensor comprises one or more of a flatness tester, a hardness tester, a density tester, a laser scanner, an optical imaging system, a hyperspectral imaging system, a near-infrared sensor, an infrared sensor, an ultrasound sensor, or a heat sensor.

25. A method of manufacturing a foam board comprising:
scanning, by a sensor, a stream of one or more fluids on a substrate;
measuring, by the sensor, one or more characteristics corresponding to distribution of the one or more fluids applied to the substrate, wherein the one or more characteristics include a number of fluid streams, a location of the fluid on the substrate, a location of an edge of the fluid on the substrate, an angle at which the fluid contacts the substrate, a volume of the fluid on the substrate, a center of mass of the fluid on the substrate, consistency of the fluid, rate of volume growth of the fluid, a rate of width growth of the fluid, a rate of height growth of the fluid, a rate of change of the angle at which the fluid contacts the substrate, or a rate of change in the center of mass of the one or more fluid streams;
receiving, at a control circuitry, data corresponding to the one or more characteristics;
comparing, at the control circuitry, the one or more measured characteristics to one or more threshold characteristics;
identifying, at the control circuitry, one or more operating parameters corresponding to the one or more measured characteristics; and
adjusting one or more operating parameters in response to a characteristic of the one or more measured characteristics falling outside a threshold of the one or more threshold characteristics.

26. The method of claim 25, further comprising:
adjusting an operating parameter of the one or more operating parameters by a first amount if the characteristic exceeds a first threshold of the one or more threshold characteristics; and
adjusting the operating parameter by a second amount if the characteristic exceeds a second threshold of the one or more threshold characteristics.

27. The method of claim 25, wherein the adjusting comprises adjustment of a control mechanism by an operator.

28. The method of claim 25, wherein the adjusting comprises adjustment of a control mechanism by a robotic device.

* * * * *